United States Patent
Lee et al.

(10) Patent No.: US 12,058,275 B2
(45) Date of Patent: Aug. 6, 2024

(54) METHOD OF SECURE AND AUTOMATED BOOTSTRAPPING ON KEYS AND CERTIFICATES FOR V2X ENVIRONMENT AND DEVICE THEREOF

(71) Applicant: Autocrypt Co., Ltd., Seoul (KR)

(72) Inventors: Seok Woo Lee, Seoul (KR); Duk Soo Kim, Seoul (KR); Eui Seok Kim, Seoul (KR); Sang Gyoo Sim, Seoul (KR); Jung Ook Kim, Seoul (KR); Jong Guk Lee, Suwon-si (KR); Young Seok Oh, Seoul (KR); Sang Seok Lee, Seoul (KR)

(73) Assignee: Autocrypt Co., Ltd., Seoul (KR)

( * ) Notice: Subject to any disclaimer, the term of this patent is extended or adjusted under 35 U.S.C. 154(b) by 336 days.

(21) Appl. No.: 17/520,484

(22) Filed: Nov. 5, 2021

(65) Prior Publication Data

US 2022/0368540 A1   Nov. 17, 2022

(30) Foreign Application Priority Data

May 13, 2021  (KR) .......................... 10-2021-0062188
Jun. 22, 2021  (KR) .......................... 10-2021-0080616

(51) Int. Cl.
  *H04L 9/32*   (2006.01)
  *H04W 4/40*   (2018.01)
(52) U.S. Cl.
  CPC ............. *H04L 9/3268* (2013.01); *H04W 4/40* (2018.02)
(58) Field of Classification Search
  None
  See application file for complete search history.

(56) References Cited

U.S. PATENT DOCUMENTS

| 9,432,356 | B1 * | 8/2016 | Johansson ............. H04L 9/3268 |
| 2017/0005999 | A1 * | 1/2017 | Choyi .................... H04W 12/08 |

(Continued)

FOREIGN PATENT DOCUMENTS

| EP | 3641372 A1 * | 4/2020 | ............ H04W 12/02 |
| GB | 2457367 A  * | 8/2009 | ......... H04L 63/0435 |

(Continued)

OTHER PUBLICATIONS

Benedikt Brecht et al., A Security Credential Management System for V2X Communications, Feb. 14, 2018, arxiv.org/abs, 1802.05323v1, 1-25 (Year: 2018).*

(Continued)

*Primary Examiner* — Phyllis A Book
(74) *Attorney, Agent, or Firm* — BROADVIEW IP LAW, PC

(57) ABSTRACT

A device for secure and automated enrollment-certificate bootstrapping on keys and certificates for a vehicle to everything (V2X) environment of a V2X end entity in a security credential management system (SCMS) for V2X communication, the device comprising: a processor; and a memory configured to store at least one instruction to be performed by the processor, the at least one instruction is configured to instruct the processor to perform steps of: by a secure bootstrapping service (SBS) agent, checking, for an SSB server, configuration information; by the SBS agent, making a request for bootstrapping data to the SBS server; and by the SBS agent, installing the bootstrapping data in the SBS server.

6 Claims, 11 Drawing Sheets

(56) References Cited

U.S. PATENT DOCUMENTS

| | | | |
|---|---|---|---|
| 2019/0089547 A1* | 3/2019 | Simplicio, Jr | H04L 9/0825 |
| 2020/0059881 A1* | 2/2020 | Gupta | H04W 12/009 |
| 2022/0376931 A1* | 11/2022 | Simplicio, Jr | H04L 67/12 |
| 2023/0029523 A1* | 2/2023 | Cunha | H04L 9/3268 |

FOREIGN PATENT DOCUMENTS

| | | |
|---|---|---|
| KR | 10-2020-0110841 A | 9/2020 |
| WO | WO-2020199134 A1 * | 10/2020 |

OTHER PUBLICATIONS

Seung-Hwan Ju et al., Certificate Management Scheme for IoT Services, Test Engineering & Management, Mar.-Apr. 2020, ISSN: 0193-4120, pp. 4186-4194.

\* cited by examiner

METHOD OF SECURE AND AUTOMATED BOOTSTRAPPING ON KEYS AND CERTIFICATES FOR V2X ENVIRONMENT AND DEVICE THEREOF

CROSS-REFERENCE TO RELATED APPLICATIONS

This application claims priority to Korean Patent Applications No. 10-2021-0062188 filed on May 13, 2021 and No. 10-2021-0080616 filed on Jun. 22, 2021 with the Korean Intellectual Property Office (KIPO), the entire contents of which are hereby incorporated by reference.

BACKGROUND

1. Technical Field

The disclosure relates to a security credential management system (SCMS) for vehicle-to-everything (V2X) communication, and more particularly to a method and device for secure and automated bootstrapping on keys and certificates for a V2X environment, in which enrollment certificates are securely managed in the SCMS.

2. Related Art

Although domestic and foreign measures for automotive cyber security have been strengthened, and secure creation, management and secure bootstrapping of a key of an end entity (EE) are also mandatory and standardized, security measures between a device configuration manager (DCM) and the EE have not been defined yet.

In 'Proposal for a new UN regulation on uniform provisions concerning the approval of vehicles with regards to cyber security and cyber security management system' (2020.6) of UNECE WP29, an encryption key is included in vehicle's data that should not be leaked by a cyber-attack. In 'Smart transportation cybersecurity guide for security internalization of ICT convergence products and services in the transportation field' (2019.12) of Korean Internet & Security Agency, secure creation of transportation ICT products, and confidentiality at transmission/storage and countermeasures for protection against physical access are stated. In the 'ITS group standard (enactment) proposal, API specification for automatic bootstrapping in SCMS' (2020, 9) of Korean Intelligent Transportation System Association, standards for secure bootstrapping for vehicle-to-everything (V2X) the end entities (OBU/RSU) are proposed.

V2X communication is a key technology that a moving vehicle exchanges traffic information with roads, traffic lights, and the like transportation infrastructure and other vehicles through a wireless network to ensure vehicle safety and to facilitate autonomous driving.

With the recent rapid-increase interest in autonomous driving, a study on V2X communication, which combines information and communication technology (ICT) with vehicles to perform wireless communication between the vehicles and everything, is being actively conducted.

IEEE 1609.2 has been proposed as a standard to solve security problems caused in the V2X communication. IEEE 1609.2 is a standard for security standard, with which a vehicle should comply in wireless communication with other vehicles or external systems, and in which digital signature and encryption technology are utilized, and details are defined to ensure secure communication based on certificates.

In a security credential management system (SCMS) for V2X communication proposed by IEEE 1609.2, an enrollment certificate, which is a certificate used in determining qualification for requesting issuance before issuing a security certificate for the V2X communication, is managed. In this case, there is a need for a method of more securely managing such an enrollment certificate to strengthen security further and smoothly perform a certification process.

SUMMARY

The disclosure has been made to solve the above problems, and an aspect of the disclosure is to provide a method and device for secure and automated bootstrapping on keys and certificates for a V2X environment, in which secure bootstrapping service (SBS) is introduced into a bootstrapping process for the sake of security enhancement, automation, and support for various end-entity environments.

In order to achieve the above-described objective, a device for secure and automated enrollment-certificate bootstrapping on keys and certificates for a vehicle to everything (V2X) environment of a V2X end entity in a security credential management system (SCMS) for V2X communication may comprise: a processor; and a memory configured to store at least one instruction to be performed by the processor, the at least one instruction is configured to instruct the processor to perform steps of: by a secure bootstrapping service (SBS) agent, checking, for an SBS server, configuration information; by the SBS agent, making a request for bootstrapping data to the SBS server; and by the SBS agent, installing the bootstrapping data in the SBS server.

In the device, a private key created outside an end entity and installed in the end entity during a bootstrapping process may be prevented from leakage, procedures of downloading bootstrapping data into a management personal computer (PC) by a manager of a device configuration manager (DCM) and installing bootstrapping data in each end-entity may be automated, and bootstrapping data according to models and purposes may be previously configured in the SBS server based on an end entity code to be provided together with the SBS agent.

The SBS agent may be configured to check an initial state of an end entity and perform a function suitable for each step.

The SBS server may be configured to previously set configuration information of an end entity, and perform bootstrapping based on the configuration information requested by the end entity.

In order to achieve the above-described objective, a method of secure and automated enrollment-certificate bootstrapping on keys and certificates for a V2X environment of a V2X end entity in a SCMS for V2X communication may comprise steps of: by a secure bootstrapping service (SBS) agent, checking, for an SBS server, configuration information; by the SBS agent, making a request for bootstrapping data to the SBS server; and by the SBS agent, installing the bootstrapping data in the SBS server.

The step of checking the configuration information may comprise steps of: by the SBS agent, checking a state of an end entity; by the SBS agent, creating a message for requesting enrollment certificate configuration information; by the SBS agent, encrypting the message for requesting the configuration information by a SBS server 1609.2 certificates; by the SBS agent, making a request for the enrollment certificate configuration information to the SBS server through hypertext transfer protocol over secure sockets layer (HTTPS) communication by an SBS server transport layer security (TLS) certificate; by the SBS server, identifying a configuration information code; by the SBS server, creating a configuration information message; by the SBS server, signing the configuration information message with a SBS server private key; by the SBS server, transmitting the enrollment certificate configuration information, which is signed with the SBS server private key, to the SBS agent through the HTTPS communication by the SBS server TLS certificate; by the SBS agent, verifying the message by the SBS server 1609.2 certificate; and by the SBS agent, storing the enrollment certificate configuration information.

The step of making the request for the bootstrapping data may comprise the steps of: by the SBS agent, checking a state of an end entity; by the SBS agent, creating a seed key pair (public/private); by the SBS agent, configures a message for requesting an enrollment certificate based on configuration information; by the SBS agent, including the public key in the message for requesting the enrollment certificate; by the SBS agent, creating a certificate signing request (CSR) based on the message for requesting the enrollment certificate with the private key; by the SBS agent, encrypting the CSR with the SBS server certificate; by the SBS agent, making a request for creating the enrollment certificate to the SBS server through hypertext transfer protocol over secure sockets layer (HTTPS) communication by the SBS server transport layer security (TLS) certificate; by the SBS server, transmitting the request for creating the enrollment certificate to a security credential management system (SCMS) so that the SCMS creates the enrollment certificate, and receiving the enrollment certificate from the SCMS; by the SBS server, signing a creation requesting response with the SBS server private key; by the SBS server, transmitting the creating requesting response, which is signed with the SBS server private key, to the SBS agent through the HTTPS communication by the SBS server TLS certificate; by the SBS agent, verifying the message by the SBS server certificate; and by the SBS agent, storing a request hash.

The step of installing the bootstrapping data may comprise steps of: by the SBS server, transmitting an enrollment; by the SBS agent, checking a state of an end entity; by the SBS agent, creating an enrollment certificate downloading message with a request hash; by the SBS agent, encrypting the downloading message with an SBS server certificate; by the SBS agent, making a request for downloading the bootstrapping data through hypertext transfer protocol over secure sockets layer (HTTPS) communication by an SBS server transport layer security (TLS) certificate; by the SBS server, signing the bootstrapping data with an SBS server private key; by the SBS server, transmitting the bootstrapping data, which is signed with the SBS server private key, to the SBS agent through the HTTPS communication by the SBS server TLS certificate; by the SBS agent, verifying the bootstrapping data by the SBS server certificate; and by the SBS agent, storing the bootstrapping data, and installing the bootstrapping data after verifying the enrolment certificate in the bootstrapping data.

In order to achieve the above-described objective, an exemplary embodiment of the disclosure provides a computer program stored in a computer-readable recording medium to implement the method of secure and automated bootstrapping on keys and certificates for a V2X environment.

In order to achieve the above-described objective, an exemplary embodiment of the disclosure provides a computer-readable recording medium to implement a program of a method of secure and automated bootstrapping on keys and certificates for a V2X environment.

According to the disclosure, the method and device for secure and automated bootstrapping on keys and certificates for a V2X environment provide a method and device for secure and automated bootstrapping on keys and certificates for a V2X environment, in which effects of security enhancement, automation, and support for various end-entity environments are expected by introducing secure bootstrapping service (SBS) into a bootstrapping process.

First, in the aspect of the security enhancement, a private key created outside an end entity and installed in the end entity during bootstrapping is prevented from leakage, and security vulnerability caused by the manual installation of bootstrapping data between a device configuration manager (DCM) and an end entity is reinforced.

Second, in the aspect of the automation, manual procedures of download from the DCM to a management personal computer (PC) and installation in each end-entity by a manager are automated.

Third, in the aspect of the support for various end-entity environments, various bootstrapping data configurations are possible based on end-entity configuration information, and thus bootstrapping data suitable for the purposes and characteristics of the end entity is provided.

DETAILED DESCRIPTION OF THE EMBODIMENTS

Figure 1:
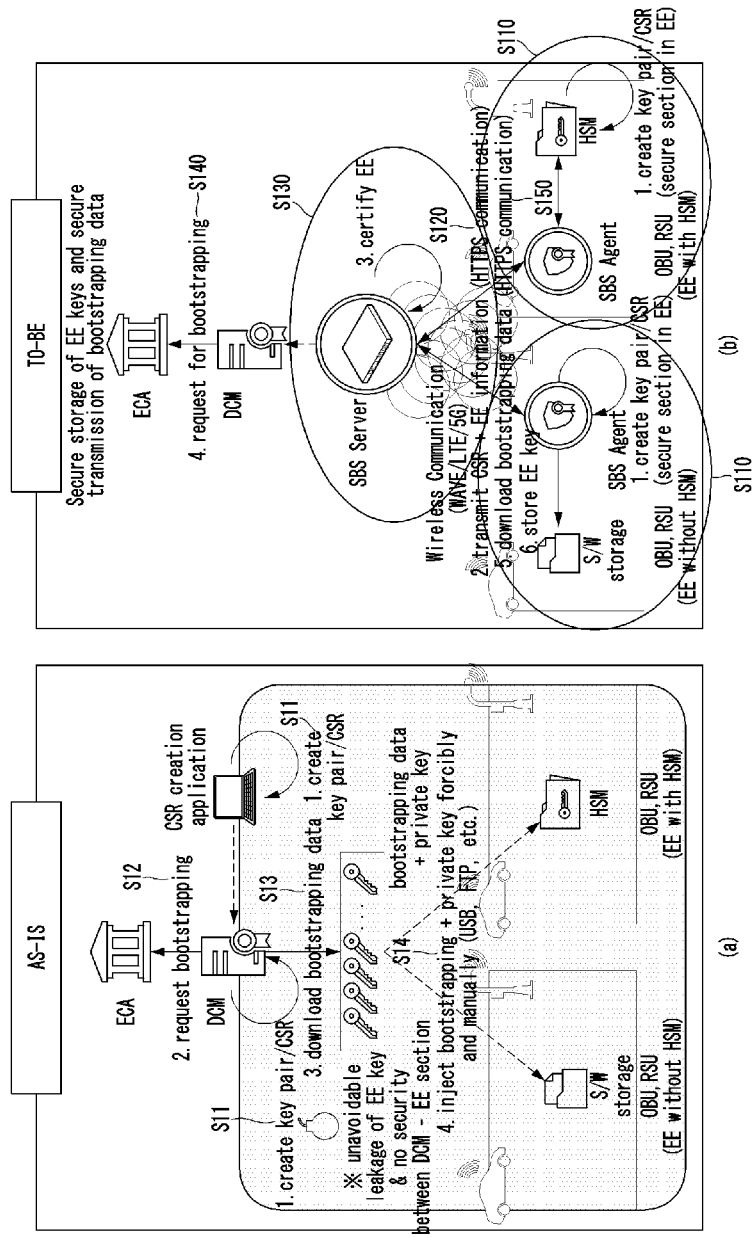
FIG. 1 is a conceptual view showing a comparison between before and after security enhancement in bootstrapping of a device for secure and automated bootstrapping on keys and certificates for an V2X environment according to an embodiment of the disclosure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings.

In a security credential management system (SCMS) for vehicle-to-everything (V2X) communication of the disclosure, a plurality of components communicate with one another to perform security certification for the V2X communication.

Each component may be embodied by one server or device, or two or more components may be combined and embodied as one server or device. Each component may include a component having an individual function of vehicle-to-infrastructure (V2I) and/or Vehicle to Vehicle (V2V) communication, or a component having a function of the V2X communication, or an intrinsically central component.

An onboard unit (OBU) may also be called onboard equipment (OBE) as a component placed inside a vehicle and performs the V2X communication.

A roadside unit (RSU) may mean various devices (for example, traffic lights) installed at a roadside and assisting transportation and autonomous driving, or a component placed inside such devices and being in charge of the V2X communication. The RSU may also be referred to as roadside equipment (RSE).

The OBU and the RSU may also be collectively called end-entities (EE) because they belong to the lowest layer, which needs to be issued with a security certificate and managed in the SCMS, as subjects to perform the V2X communication directly.

FIG. 1 is a conceptual view showing a comparison between before and after security enhancement in bootstrapping of a device 100 for secure and automated bootstrapping on keys and certificates for an V2X environment according to an embodiment of the disclosure.

Referring to FIG. 1, the related art (AS-IS) shown in FIG. 1(a) has a severe security problem that a private key of an end entity is leaked during the bootstrapping and a security method is not applied between a discontinuous conduction mode (DCM) and an EE section, but a future art (To-Be) shown in FIG. 1(b) shows that the device 100 for secure and automated bootstrapping on keys and certificates for the V2X environment according to the disclosure allows for security by creating an end-entity key in a secure section of the end entity during an automation process using secure bootstrapping service (SBS), and employs hypertext transfer protocol over secure sockets layer (HTTPS) communication for communication between a discontinuous conduction mode (DCM) and the EE.

The device 100 for secure and automated bootstrapping on keys and certificates for the V2X environment according to the disclosure includes an SBS agent and an SBS server in addition to the elements of the conventional bootstrapping device, and bootstrapping data includes an enrollment certificate, a policy file, a chain file, information about network connection to the SCMS, and the like.

In the device 100 for secure and automated bootstrapping on keys and certificates for the V2X environment according to the disclosure, bootstrapping automation of the EE has the main functions of allowing the SBS agent to check the initial state of the EE and carry out functions suitable for respective steps, and allowing the SBS server to previously set configuration information of the EE and perform bootstrapping based on the configuration information requested by the EE.

Referring to FIG. 1(a), a conventional enrollment-certificate bootstrapping method includes step S11 of creating a key pair (private key and public key)/a certificate signing request (CSR), step S12 of requesting bootstrapping, step S13 of downloading bootstrapping data, and step S14 of bootstrapping and injecting the private key forcibly and manually (universal serial bus (USB), file transfer protocol (FTP), and the like).

Referring to FIG. 1(b), the method of secure and automated bootstrapping on keys and certificates for a V2X environment according to an embodiment of the disclosure includes step S110 of creating a key pair (private key and public key)/a CSR (a security section in the EE), step S120 of transmitting the CSR and the EE information (HTTPS communication), step S130 of certifying the EE, step S140 of requesting bootstrapping, and step S150 of downloading bootstrapping data (HTTPS communication).

Figure 2:
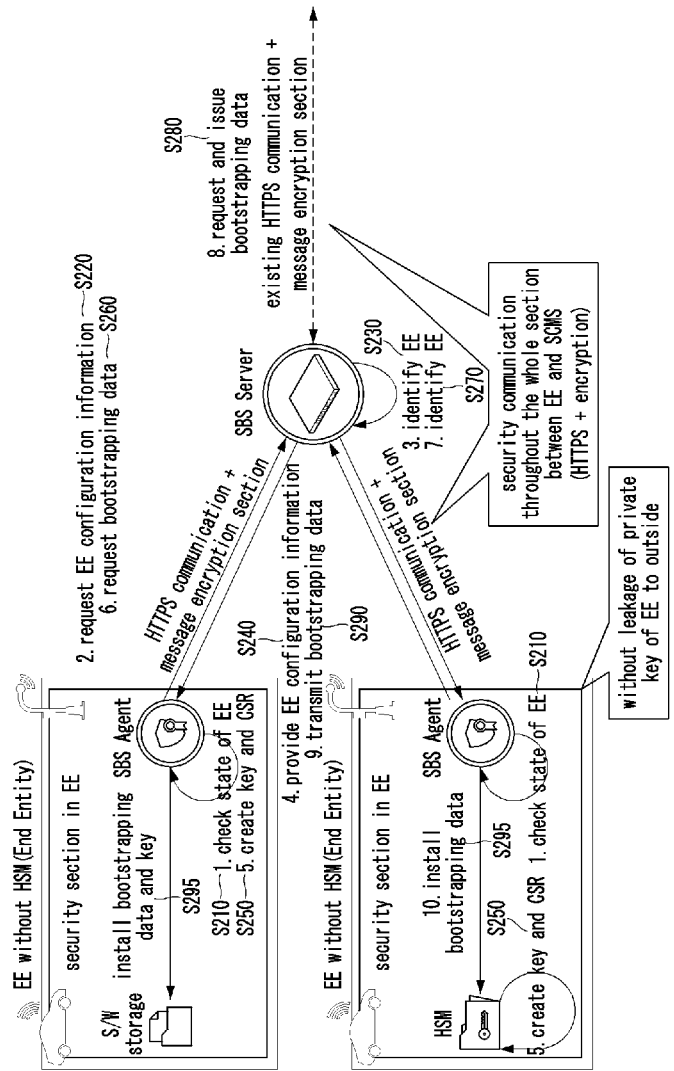
FIG. 2 is a conceptual view showing necessities and advantageous characteristics of the security enhancement at bootstrapping of the device for secure and automated bootstrapping on keys and certificates for the V2X environment according to an embodiment of the disclosure.

FIG. 2 is a conceptual view showing necessities and advantageous characteristics of the security enhancement at bootstrapping of the device 100 for secure and automated bootstrapping on keys and certificates for the V2X environment according to an embodiment of the disclosure.

Referring to FIG. 2, the device 100 for secure and automated bootstrapping on keys and certificates for the V2X environment according to the disclosure performs the bootstrapping process based on the HTTPS communication and message encryption throughout the section between the end entity and the SCMS without exposing the key of the EE to the outside of the EE regardless of the presence or absence of a hardware security module (HSM) card. This enhances the security of the device 100 for secure and automated bootstrapping on keys and certificates for the V2X environment according to the disclosure.

When the HSM card is absent in the EE, the method of secure and automated bootstrapping on keys and certificates for a V2X environment according to an embodiment of the disclosure includes step S210 of checking the state of the EE, step S220 of requesting EE configuration information, step S230 of identifying the EE, step S240 of providing the EE configuration information, step S250 of creating a key and a CSR, step S260 of requesting the bootstrapping data, step S270 of identifying the EE, step S280 of requesting and issuing the bootstrapping data, step S290 of transmitting the bootstrapping data, and step S295 of installing the bootstrapping data and the key, in which the SBS agent installs the bootstrapping data and the key in a software (S/W) storage in the step S295.

When the HSM card is present in the EE, the method of secure and automated bootstrapping on keys and certificates for a V2X environment according to an embodiment of the disclosure includes step S210 of checking the state of the EE, step S220 of requesting EE configuration information, step S230 of identifying the EE, step S240 of providing the EE configuration information, step S250 of creating a key and a CSR, step S260 of requesting the bootstrapping data, step S270 of identifying the EE, step S280 of requesting and issuing the bootstrapping data, step S290 of transmitting the bootstrapping data, and step S295 of installing the bootstrapping data and the key, in which the SBS agent installs the bootstrapping data and the key in the HSM card in the step S295.

Figure 3:
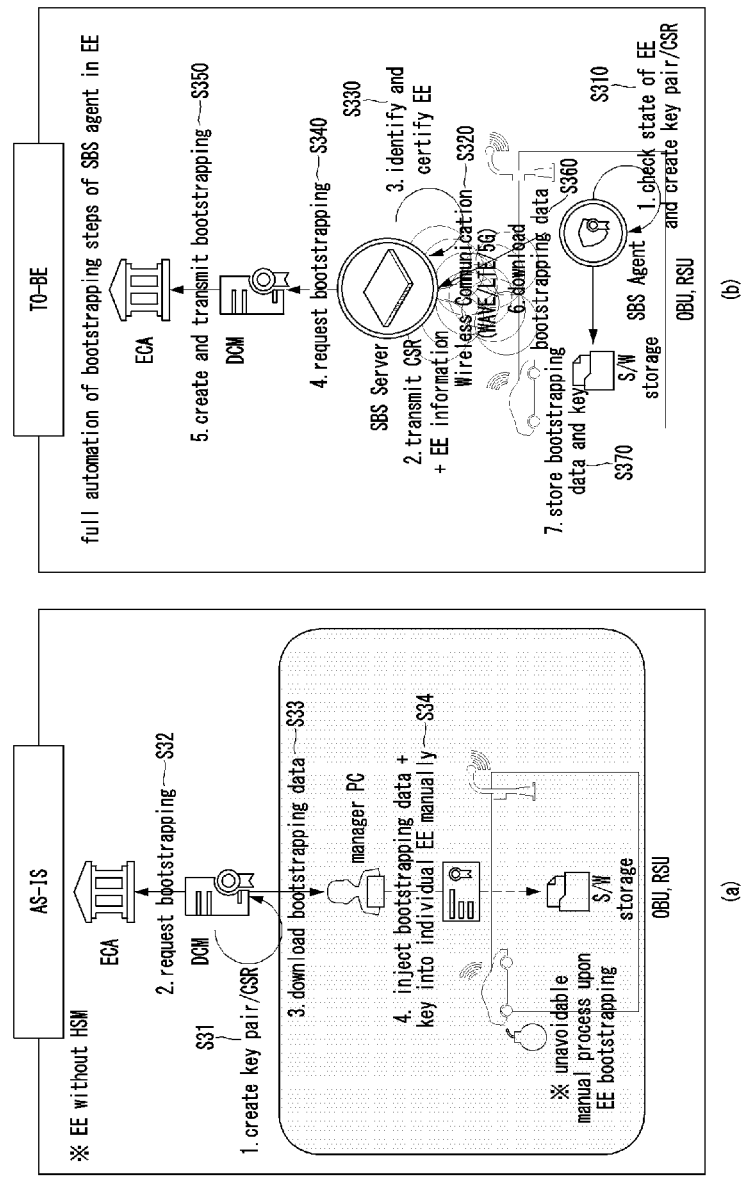
FIG. 3 is a conceptual view showing a comparison between before and after automation in bootstrapping of the EE of the device for secure and automated bootstrapping on keys and certificates for a V2X environment according to an embodiment of the disclosure.

FIG. 3 is a conceptual view showing a comparison between before and after automation in bootstrapping of the EE of the device for secure and automated bootstrapping on keys and certificates for a V2X environment according to an embodiment of the disclosure.

Referring to FIG. 3, the bootstrapping request and installation steps between the DCM and the EE, the explicit procedures of which are not specified by IEEE 1609.2.1, and the like in the conventional CAMP SCMS PoC 1.2.2, KISA V2X security-certification system detailed technical standards (2020), are automatically carried out by the SBS server and the SBS agent of the device 100 for secure and automated bootstrapping on keys and certificates for the V2X environment according to the disclosure.

Referring to FIG. 3(a), a conventional enrollment-certificate bootstrapping method includes step S31 of creating a key pair/a CSR, step S32 of requesting bootstrapping, step S33 of downloading bootstrapping data in a manager PC, and step S34 of manually injecting the bootstrapping data and the key in each EE.

Referring to FIG. 3(b), the method of secure and automated bootstrapping on keys and certificates for the V2X environment according to the disclosure includes step S310 of checking a state of an EE and creating a key pair/a CSR, step S320 of transmitting the CSR and EE information, step S330 of allowing the SBS server to identify and certify the EE, step S340 of allowing the SBS server to request bootstrapping, step S350 of creating and transmitting the bootstrapping, step S360 of downloading bootstrapping data, and step S370 of allowing the SBS agent to store the bootstrapping data and the key from the SBS server in the S/W storage.

Figure 4:
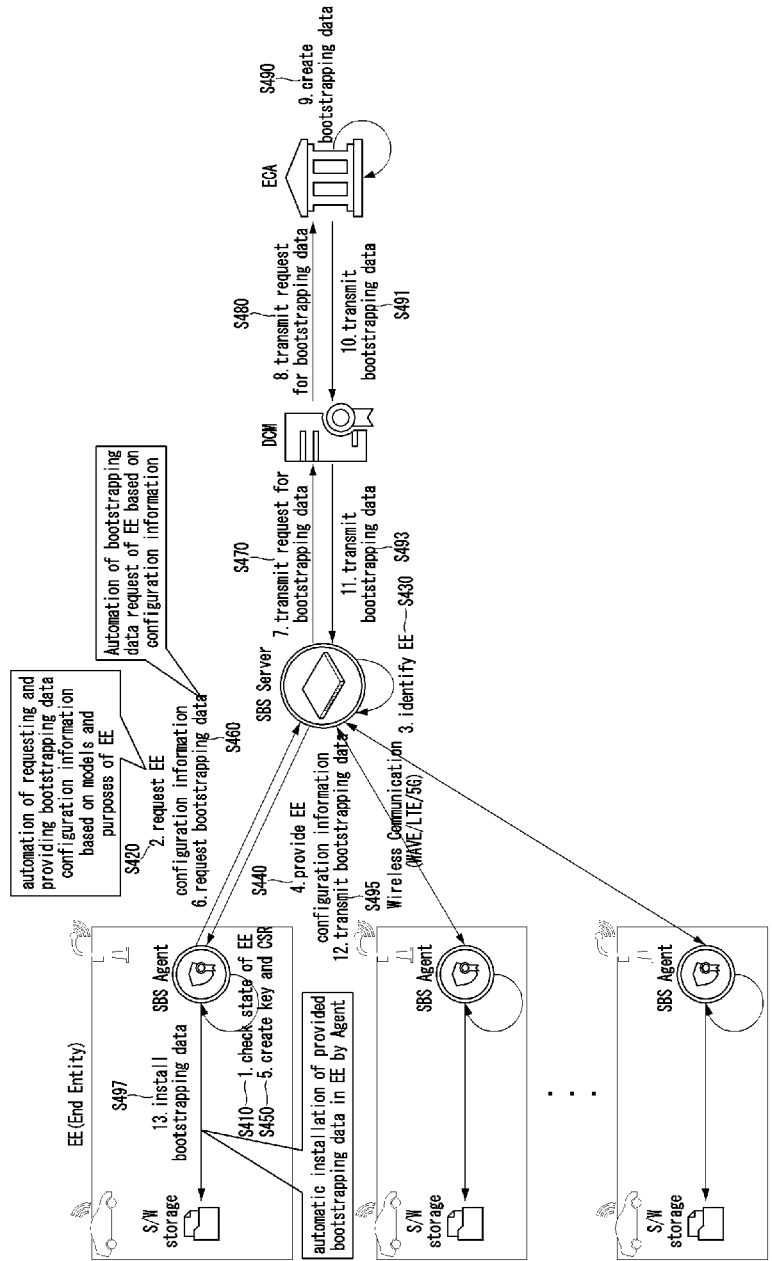
FIG. 4 is a conceptual view showing necessities and advantageous characteristics of the automation at bootstrapping of the EE of the device for secure and automated bootstrapping on keys and certificates for the V2X environment according to an embodiment of the disclosure.

FIG. 4 is a conceptual view showing necessities and advantageous characteristics of the automation at bootstrapping of the EE of the device 100 for secure and automated bootstrapping on keys and certificates for the V2X environment according to an embodiment of the disclosure.

Referring to FIG. 4, the device 100 for secure and automated bootstrapping on keys and certificates for the V2X environment, according to an embodiment of the disclosure, employs the SBS agent to fully automates the CSR that was manually generated by the manager, the request for creating the bootstrapping data, and the installation of the bootstrapping data and thus performs automated bootstrapping for each of mass EE under a factory environment (i.e., a manufacturing environment) or a real-road environment.

The method of secure and automated bootstrapping on keys and certificates for the V2X environment according to an embodiment of the disclosure includes step S410 of checking states of a plurality of EE, step S420 of requesting EE configuration information, step S430 of allowing the SBS server to identify the plurality of EE, step S440 of providing the EE configuration information, step S450 of creating a plurality of keys and CSR, step S460 of requesting bootstrapping data, step S470 of transmitting a request for the bootstrapping data, step S480 of transmitting a request for the bootstrapping data, step S490 of creating the bootstrapping data, step S491 of transmitting the bootstrapping data, step S493 of transmitting the bootstrapping data, step S495 of transmitting the bootstrapping data, and step S497 of installing the bootstrapping data.

Figure 5:
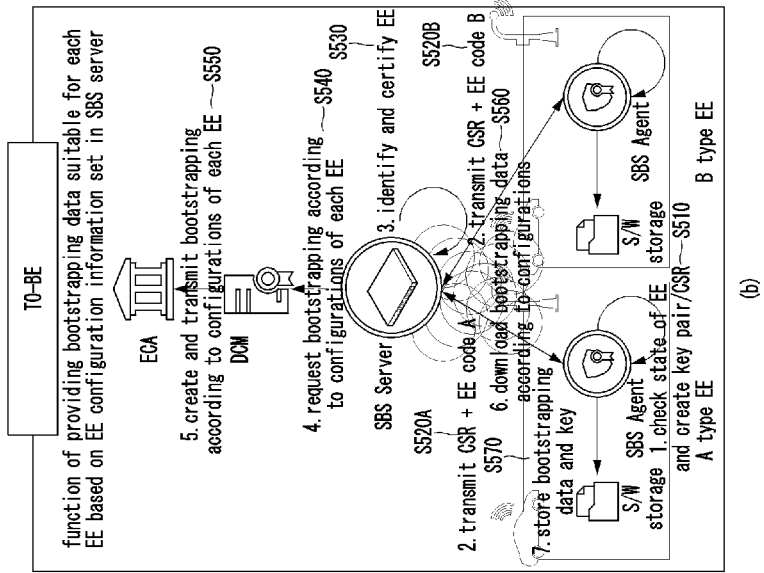
FIG. 5 is a conceptual view showing a comparison between before and after simultaneous support for various bootstrapping environments in mass production of the device for secure and automated bootstrapping on keys and certificates for the V2X environment according to an embodiment of the disclosure.
Figure 5:
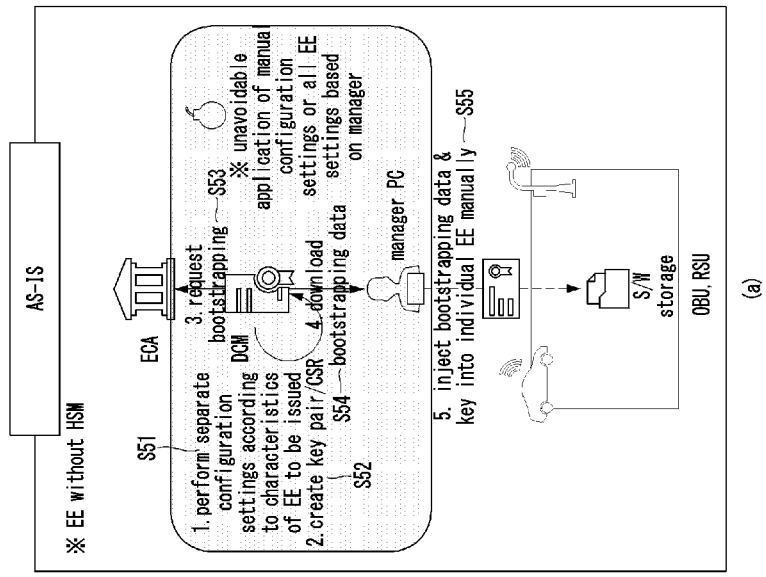

FIG. 5 is a conceptual view showing a comparison between before and after simultaneous support for various bootstrapping environments in mass production of the device 100 for secure and automated bootstrapping on keys and certificates for the V2X environment according to an embodiment of the disclosure.

Referring to FIG. 5, departing from the exiting environment where bootstrapping data configurations are manually managed by the DCM as disclosed in FIG. 5(*a*), a configuration information code for each EE as disclosed in FIG. 5(*b*) is previously injected in an EE manufacturing step, and the bootstrapping data is configured by the SBS server based on configuration information for each code and transmitted to the EE.

According to the disclosure, to solve the problems of the related art, the device for secure and automated bootstrapping on keys and certificates for the V2X environment is added, and the enrollment certificate is issued through the added device.

The device for secure and automated bootstrapping on keys and certificates for a V2X environment according to an embodiment of the disclosure is illustrated by the name of an enrollment registration authority (ERA) and may be referred to as the ERA hereinafter.

Referring to FIG. 5(*a*), a conventional enrollment-certificate bootstrapping method includes step S51 of performing separate configuration settings according to characteristics of an EE to be issued, step S52 of creating a key pair/a CSR, step S53 of requesting bootstrapping, step S54 of downloading bootstrapping data, and step S55 of manually injecting the bootstrapping data and the key into the individual EE.

Referring to FIG. 5(*b*), the method of secure and automated bootstrapping on keys and certificates for the V2X environment according to an embodiment of the disclosure includes step 510 of checking each EE state and creating a key pair/a CSR in each of an A type EE and a B type EE, step 520A of transmitting the CSR and an EE code A, step 520B of transmission of the CSR and an EE code B, step S530 of allowing the SBS server to identify and certify each EE, step S540 of requesting bootstrapping according to EE configurations, step S550 of creating and transmitting the bootstrapping according to the EE configurations, step S560 of downloading bootstrapping data according to the configurations, and step S570 of storing the bootstrapping data and the key in each of the A type EE and the B type EE.

Figure 6:
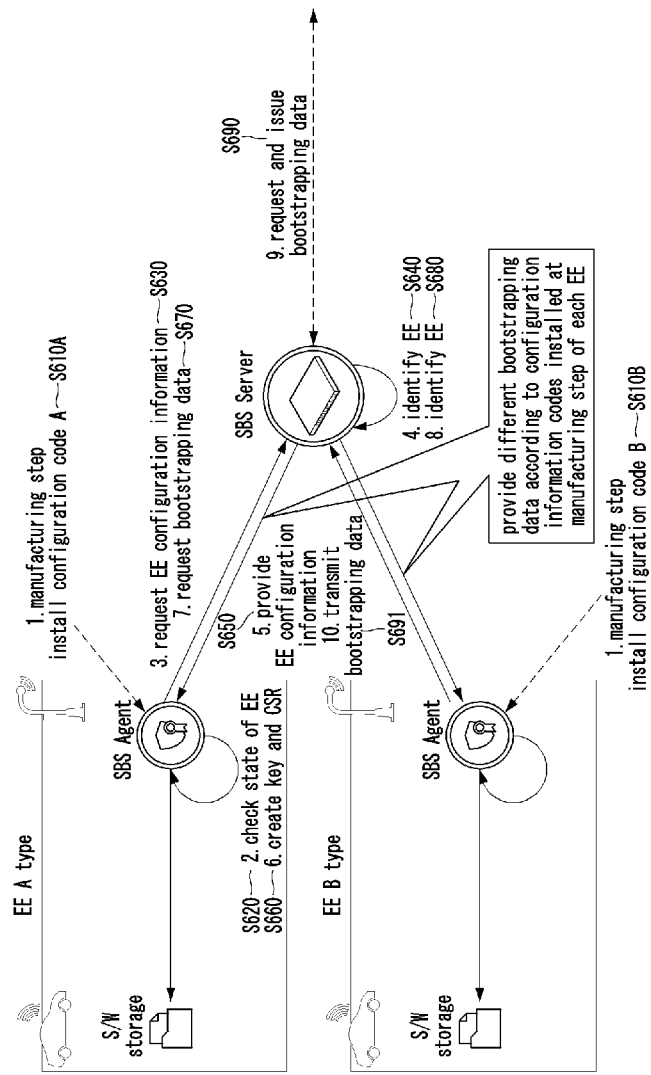
FIG. 6 is a conceptual view showing necessities and advantageous characteristics of the simultaneous support for various bootstrapping environments in mass production of the method and device for secure and automated bootstrapping on keys and certificates for the V2X environment according to an embodiment of the disclosure.

FIG. 6 is a conceptual view showing necessities and advantageous characteristics of the simultaneous support for various bootstrapping environments in mass production of the method and device for secure and automated bootstrapping on keys and certificates for the V2X environment according to an embodiment of the disclosure.

Referring to FIG. 6, an SBS server manager can provide a bootstrapping data configuration according to various EE environments based on a function of managing a configuration code and configuration information according to the EE.

When the device 100 for secure and automated bootstrapping on keys and certificates for the V2X environment according to an embodiment of the disclosure submits the EE (or EE information) to be certified to a certification laboratory as a preliminary procedure for issuance of an enrollment certificate, the certification lab tests the EE to determine whether the EE satisfies predefined requirements and certifies the EE satisfying the requirements. The certification lab may store a certificate and device information of the certified EE in a database.

The method of secure and automated bootstrapping on keys and certificates for the V2X environment according to an embodiment of the disclosure includes step S610A of installing a manufacturing step configuration code A, step S610B of installing a manufacturing step configuration code B, step S620 of checking a state of an EE, step S630A of requesting EE configuration information A, step S630B of requesting EE configuration information B, step S640 of identifying the EE, step S650 of providing the EE configuration information, step S660 of creating a key and a CSR, step S670 of bootstrapping, step S680 of identifying the EE, step S690 of requesting and issuing bootstrapping data, step S691 of transmitting the bootstrapping data.

In the device 100 for secure and automated bootstrapping on keys and certificates for the V2X environment according to an embodiment of the disclosure, initially installed files of when the EE for driving the SBS is initially manufactured include an SBS agent, a SBS server 1609.2 certificate, an EE configuration code, an SBS server TLS certificate, and SBS server access information.

The SBS agent is used as a program for collecting configuration information and requesting and installing bootstrapping data in the initial state of the EE.

The SBS server 1609.2 certificate is an SBS server infrastructure certificate (sbs.oer), which the SBS agent uses to make an encrypted request to the SBS server.

The EE configuration code is used as a code (sbs_code.txt) including the bootstrapping data configuration information according to the models and purposes of the corresponding EE.

The SBS server TLS certificate is used as an X.509 certificate (sbs.tls) for requesting and downloading a certificate through HTTPS communication between the SBS agent and the SBS server.

The SBS server access information is used as an Internet protocol (IP) or the like network information (sbs_url.txt) by which the SBS agent accesses the SBS server.

Figure 7:
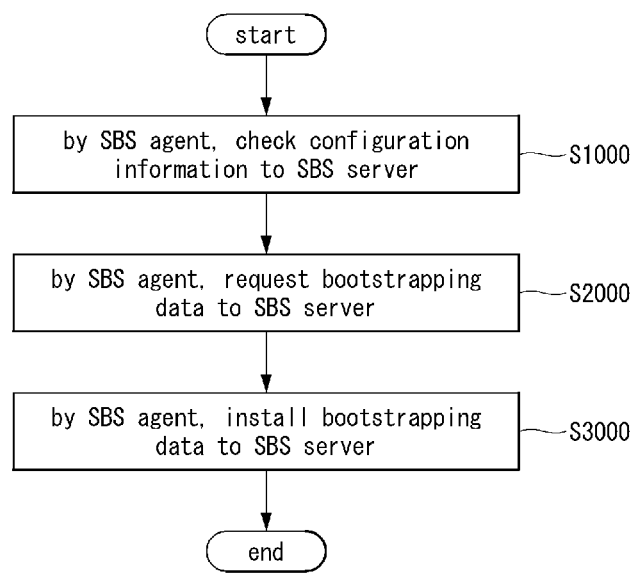
FIG. 7 is a flowchart of a method of secure and automated bootstrapping on keys and certificates for the V2X environment according to an embodiment of the disclosure.

FIG. 7 is a flowchart of a method of secure and automated bootstrapping on keys and certificates for the V2X environment according to an embodiment of the disclosure.

Referring to FIG. 7, in the SCMS for the V2X communication using the device 100 for secure and automated bootstrapping on keys and certificates for the V2X environment according to an embodiment of the disclosure, a secure and automated bootstrapping method of a V2X EE may be performed by steps S1000 to S3000.

In step S1000, an SBS agent checks configuration information to an SBS server.

In step S2000, the SBS agent requests for bootstrapping data to the SBS server.

In step S3000, the SBS agent installs the bootstrapping data to the SBS server.

As the main functions of the simultaneous support for various bootstrapping environments in mass production based on the method of secure and automated bootstrapping on keys and certificates for a V2X environment according to an embodiment of the disclosure, the bootstrapping configuration in each EE is provided by a function of managing an EE configuration code installed in the EE together with the SBS agent when manufactured, and the agent configuration information of the SBS server.

The method of secure and automated bootstrapping on keys and certificates for a V2X environment according to an embodiment of the disclosure includes the step S1000 of managing the configuration information, the step S2000 of requesting the configuration information, and the step S3000 of requesting and installing bootstrapping.

In the configuration information managing step S1000 of the method of secure and automated bootstrapping on keys and certificates for a V2X environment according to an embodiment of the disclosure, the SBS server functions to manage initialization of the SBS agent and configuration information of the SBS agent. The function of managing the initialization of the SBS agent refers to the management of uploading/downloading/viewing the SBS agent initialization file. The function of managing the configuration information of the SBS agent refers to the management of CSR configuration information of the SBS agent (according to codes), downloading/viewing/adding/modifying/deleting the configuration information, and history of requesting/receiving configuration information.

In the configuration information requesting step S2000 of the method of secure and automated bootstrapping on keys and certificates for a V2X environment according to an embodiment of the disclosure, the SBS server functions as a configuration information API, and the SBS agent functions to check initial data and request the CSR configuration information of the SBS agent. The SBS server functioning as the configuration information API is to function as an API (Agent—server) for requesting the EE configuration information and viewing a history list. The function of the SBS agent to check the initial data refers to a function of decompressing an initial data file (sbs_init.zip) to check four files of 'sbs_code.txt,' 'sbs.oer,' 'sbs_url.txt,' and 'sbs.tls.' The function of the SBS agent to request the CSR configuration information of the SBS agent refers to a function of making a request for the configuration information of the corresponding SBS agent to the SBS server.

In the bootstrapping requesting and installing step S3000 of the method of secure and automated bootstrapping on keys and certificates for a V2X environment according to an embodiment of the disclosure, the SBS agent functions to configure and transmit the CSR, receive the bootstrapping data, and verify the bootstrapping data for lowest common multiple (LCM) installation, and the SBS server functions to manage agent bootstrapping data, and functions as an agent bootstrapping data API. The function of configuring and transmitting the CSR of the SBS agent is to configure the CSR with configuration information received from the SBS server, and transmit the CSR to the SBS server. The function of receiving agent bootstrapping data is to receive an enrollment response Zip file defined in the crash avoidance metrics partnership (CAMP) standards. The function of verifying the agent bootstrapping data for the LCM installation is to verify the received bootstrapping data, and perform the LCM installation when there are no problems but request redownloading when there is a problem. The function of the SBS server to manage the agent bootstrapping data is to manage the requesting/receiving/history of the EE bootstrapping data, the format of which complies with the CAMP standards. The SBS server functioning as the agent bootstrapping data API is to receive the bootstrapping data after transmitting the CSR to the SCMS, interwork with the enrollment certificate authority (ECA, ERA), and view a history list of requesting the EE bootstrapping data (Server—SCMS).

Figure 8:
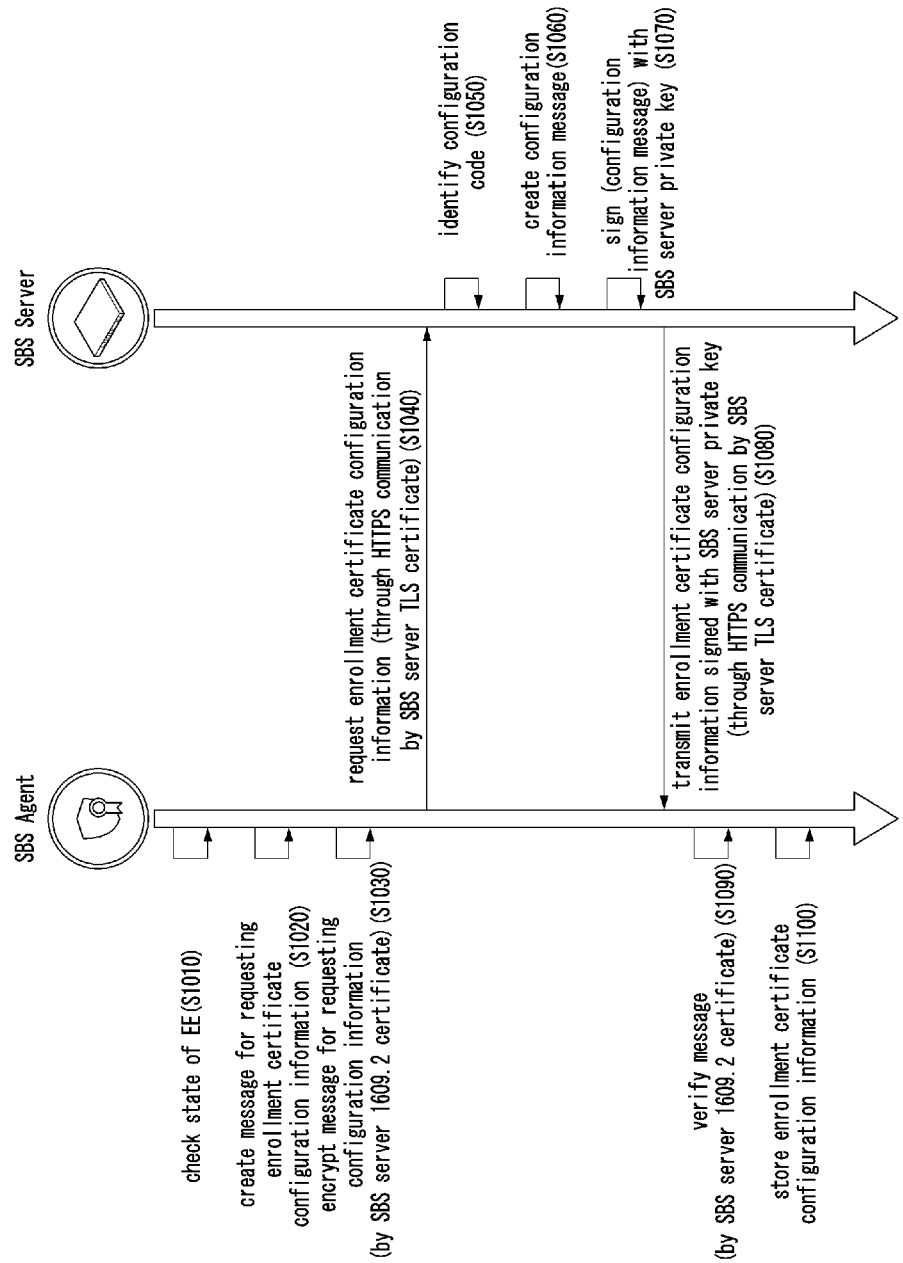
FIG. 8 shows an SBS procedure of the configuration information checking step in the method of secure and automated bootstrapping on keys and certificates for the V2X environment according to an embodiment of the disclosure.

FIG. 8 shows an SBS procedure of the configuration information checking step S1000 in the method of secure and automated bootstrapping on keys and certificates for the V2X environment according to an embodiment of the disclosure.

In step S1010, the SBS agent checks the state of the EE.

In step S1020, the SBS agent creates a message for requesting the enrollment certificate configuration information.

In step S1030, the SBS agent encrypts the message for requesting the configuration information with the SBS server 1609.2 certificate.

In step S1040, the SBS agent makes a request for the enrollment certificate configuration information through the HTTPS communication by an SBS server (transport layer security) TLS certificate.

In step S1050, the SBS server identifies a configuration information code.

In step S1060, the SBS server creates a configuration information message.

In step S1070, the SBS server signs the configuration information message with a SBS server private key.

In step S1080, the SBS server transmits the enrollment certificate configuration information, signed with the SBS server private key, to the SBS agent through the HTTPS communication by the SBS server TLS certificate.

In step S1090, the SBS agent verifies the message by the SBS server 1609.2 certificate.

In step S1100 the SBS agent stores the enrollment certificate configuration information.

Figure 9:
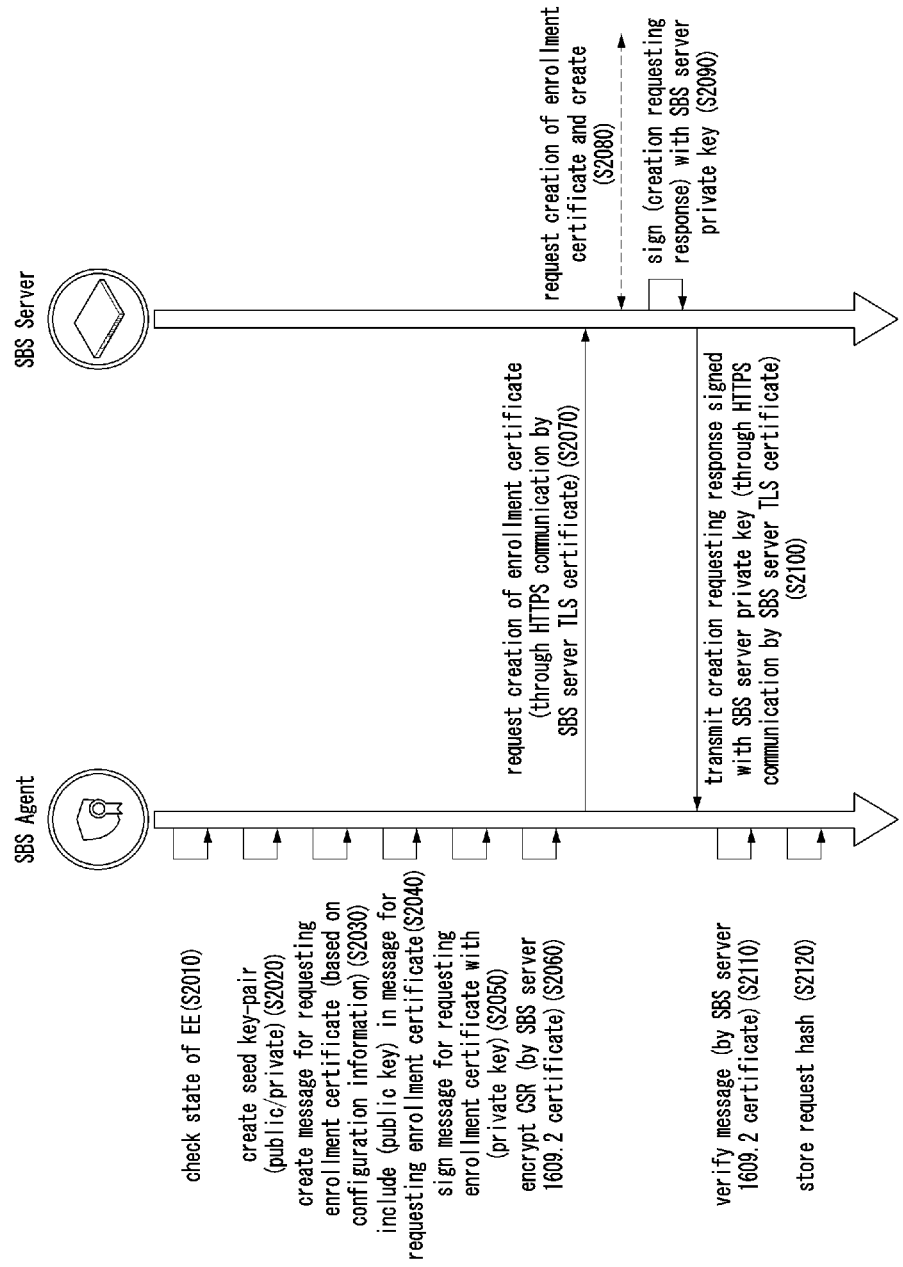
FIG. 9 shows an SBS procedure of the bootstrapping data requesting step in the method of secure and automated bootstrapping on keys and certificates for the V2X environment according to an embodiment of the disclosure.

FIG. 9 shows an SBS procedure of the bootstrapping data requesting step S2000 in the method of secure and automated bootstrapping on keys and certificates for the V2X environment according to an embodiment of the disclosure.

In step S2010, the SBS agent checks the state of the EE.

In step S2020, the SBS agent creates a seed key pair (Public/Private).

In step S2030, the SBS agent configures a message for requesting an enrollment certificate based on configuration information.

In step S2040, the SBS agent includes the public key in the message for requesting the enrollment certificate.

In step S2050, the SBS agent signs the message for requesting the enrollment certificate with the private key (CSR creation).

In step S2060, the SBS agent encrypts the CSR with the SBS server 1609.2 certificate.

In step S2070, the SBS agent makes a request for creating an enrollment certificate to the SBS server through the HTTPS communication by the SBS server TLS certificate.

In step S2080, the SBS server creates the enrollment certificate by requesting the creation.

In step S2090, the SBS server signs a creation requesting response with an SBS server private key.

In step S2100, the SBS server transmits the creation requesting a response, which is signed with the SBS server private key, to the SBS agent through the HTTPS communication by the SBS server TLS certificate.

In step S2110, the SBS agent verifies the message by the SBS server 1609.2 certificate.

In step S2120, the SBS agent stores a request hash.

Figure 10:
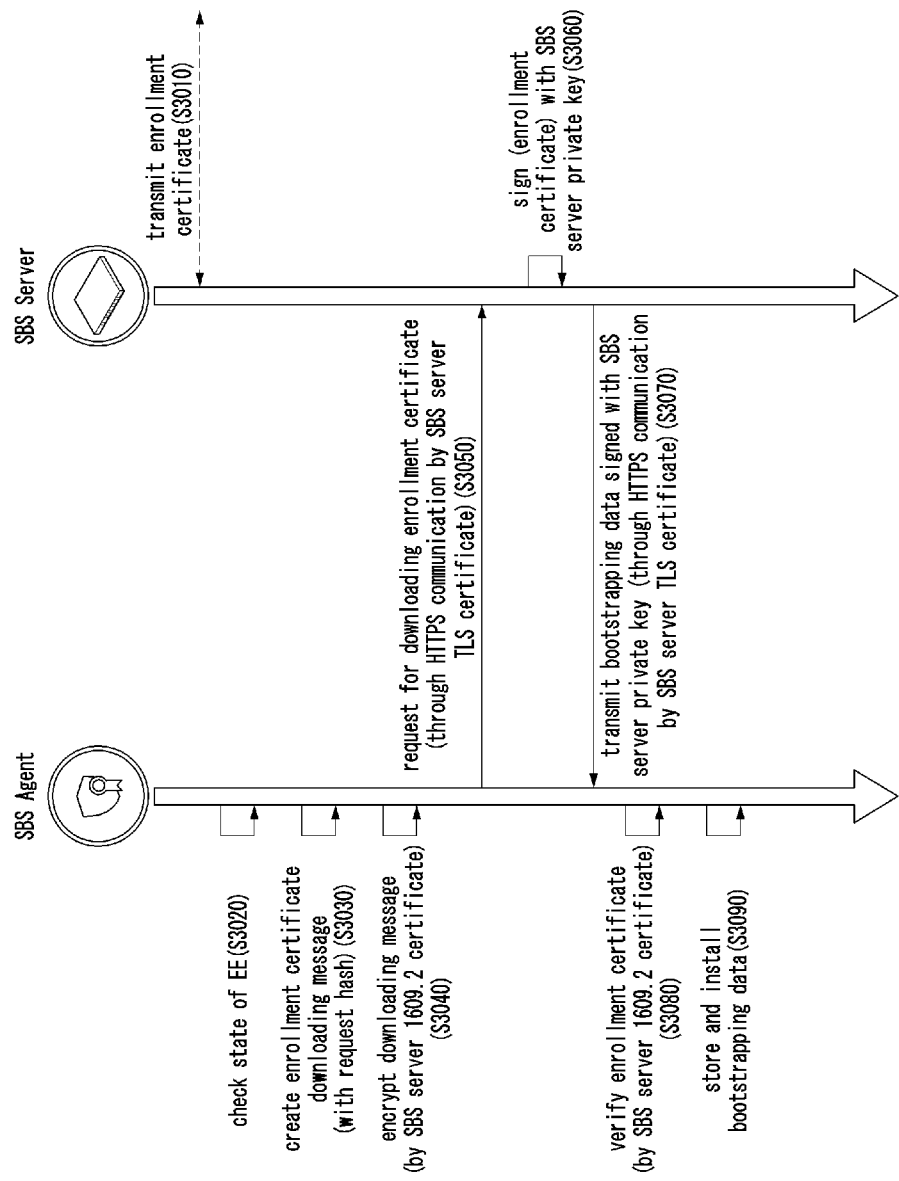
FIG. 10 shows an SBS procedure of the bootstrapping data installing step in the method of secure and automated bootstrapping on keys and certificates for the V2X environment according to an embodiment of the disclosure.

FIG. 10 shows an SBS procedure of the bootstrapping data installing step S3000 in the method of secure and automated bootstrapping on keys and certificates for the V2X environment according to an embodiment of the disclosure.

In step S3010, the SBS server transmits an enrollment certificate.

In step S3020, the SBS agent checks the state of the EE.

In step S3030, the SBS agent creates an enrollment certificate downloading a message with the request hash.

In step S3040, the SBS agent encrypts the downloading message with the SBS server 1609.2 certificate.

In step S3050, the SBS agent makes a request for downloading the enrollment certificate through the HTTPS communication by the SBS server TLS certificate.

In step S3060, the SBS server signs the enrollment certificate with the SBS server private key.

In step S3070, the SBS server transmits the bootstrapping data, which is signed with the SBS server private key, to the SBS agent through the HTTPS communication by the SBS server TLS certificate.

In step S3080, the SBS agent verifies the enrollment certificate by the SBS server 1609.2 certificate.

In step S3090, the SBS agent stores and installs the bootstrapping data.

Figure 11:
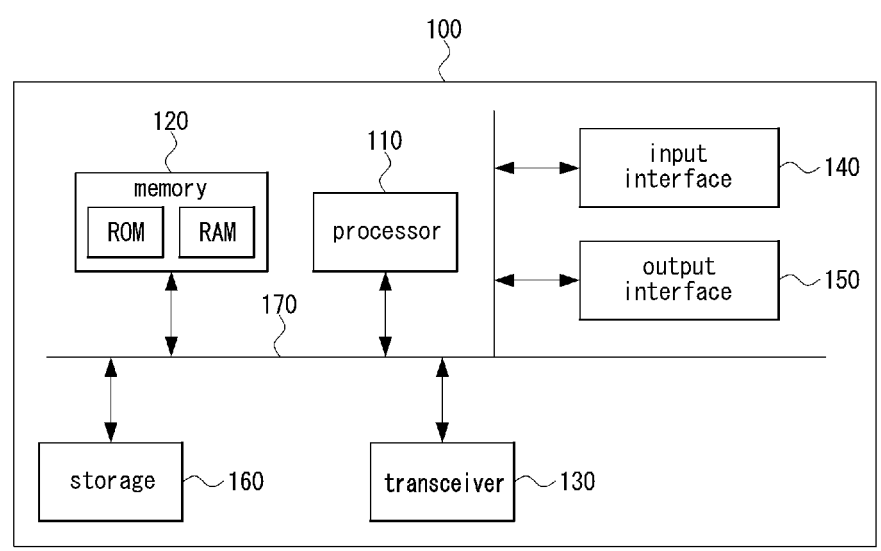
FIG. 11 is a block diagram of the device for secure and automated bootstrapping on keys and certificates for the V2X environment according to an embodiment of the disclosure.

FIG. 11 is a block diagram of the device 100 for secure and automated bootstrapping on keys and certificates for the V2X environment according to an embodiment of the disclosure.

Referring to FIG. 11, the device 100 for secure and automated bootstrapping on keys and certificates for the V2X environment according to an embodiment of the disclosure refers to a device for managing the enrollment certificate by relaying between the ECA and the DCM, and includes at least one processor, and a memory configured to store instructions for instructing the at least one processor to perform at least one step.

The at least one processor 110 may refer to a central processing unit (CPU), a graphics processing unit (GPU), or a dedicated processor for performing the methods according to embodiments of the disclosure. The memory and a storage 160 may be embodied by at least one of a volatile storage medium and a nonvolatile storage medium. For example, the memory 120 may include at least one of a read-only memory (ROM) and a random access memory (RAM).

Further, the device 100 for secure and automated bootstrapping on keys and certificates for the V2X environment may include a transceiver 130 to perform communication through a wireless network. In addition, the device 100 for secure and automated bootstrapping on keys and certificates for the V2X environment may include an input interface 140, an output interface 150, the storage 160, and the like. Such elements included in the device 100 for secure and automated bootstrapping on keys and certificates for the V2X environment are connected to and communicate with one another via a bus 170.

The device 100 for secure and automated bootstrapping on keys and certificates for the V2X environment, according to the disclosure, may, for example, include a desktop computer, a laptop computer, a notebook computer, a smartphone, a tablet PC, a mobile phone, a smart watch, smart glasses, an e-book reader, a portable multimedia player (PMP), a portable game player, a navigation device, a digital camera, a digital multimedia broadcasting (DMB) player, a digital audio recorder, a digital audio player, a digital video recorder, a digital video player, a personal digital assistant, and the like which can support communication.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A device for secure and automated enrollment-certificate bootstrapping on keys and certificates for a vehicle to everything (V2X) environment of a V2X end entity in a security credential management system (SCMS) for V2X communication, the device comprising:
   a processor; and
   a memory configured to store at least one instruction to be performed by the processor of the secure bootstrapping service (SBS) agent, including the following steps:
   generating a private key in a secured section of the end entity for preventing leakage of the private key;
   configuration information for the end entity that is stored on an SBS server;
   making a request for bootstrapping data from the SBS server; and
   installing the bootstrapping data in the SBS server, wherein:
   procedures of downloading bootstrapping data into a management personal computer (PC) by a manager of a device configuration manager (DCM) and installing bootstrapping data in each end-entity are automated; and
   bootstrapping data according to models and purposes is previously configured in the SBS server based on an end entity code to be provided together with the SBS agent.

2. The device according to claim 1, wherein the SBS agent is configured to check an initial state of an end entity and perform each of the step of checking the configuration information, the step of the making the request for bootstrapping data, and the step of the installing the bootstrapping data.

3. The device according to claim 1, wherein the SBS server is configured to set configuration information of an end entity, and perform bootstrapping based on the configuration information requested by the end entity.

4. A method of secure and automated enrollment-certificate bootstrapping on keys and certificates for a vehicle to everything (V2X) environment of a V2X end entity in a security credential management system (SCMS) for V2X communication, the method comprising steps of:
   by a secure bootstrapping service (SBS) agent, checking, for an SBS server, configuration information;
   by the SBS agent, making a request for bootstrapping data to the SBS server; and
   by the SBS agent, installing the bootstrapping data in the SBS server, wherein the step of checking the configuration information comprises steps of:
   creating a message for requesting enrollment certificate configuration information;

encrypting the message for requesting the configuration information from an SBS server comprising 1609.2 certificates;

making a request for the enrollment certificate configuration information to the SBS server through hypertext transfer protocol over secure sockets layer (HTTPS) communication to be obtained via the SBS server transport layer security (TLS) certificate;

wherein the step of checking the configuration information further comprises the following additional steps performed by the SBS server:

identifying a configuration information code;

creating a configuration information message;

signing the configuration information message with a SBS server private key;

transmitting the enrollment certificate configuration information, which is signed with the SBS server private key, to the SBS agent through the HTTPS communication using the SBS server TLS certificate; and wherein the step of checking the configuration information further comprises the following additional steps performed by the SBS agent:

verifying the message by the SBS server 1609.2 certificate; and storing the enrollment certificate configuration information.

5. The method according to claim 4, wherein the step of making the request for the bootstrapping data by the SBS agent comprises the steps of:

creating a seed key pair (public/private);

configuring a message for requesting an enrollment certificate based on configuration information;

including the public key in the message for requesting the enrollment certificate;

creating a certificate signing request (CSR) based on the message for requesting the enrollment certificate with the private key;

encrypting the CSR with the SBS server certificate;

making a request for creating the enrollment certificate to the SBS server through hypertext transfer protocol over secure sockets layer (HTTPS) communication using the SBS server transport layer security (TLS) certificate;

transmitting the request for creating the enrollment certificate to a security credential management system (SCMS) so that the SCMS creates the enrollment certificate, and receiving the enrollment certificate from the SCMS;

signing a creation requesting response with the SBS server private key;

transmitting the creating requesting response, which is signed with the SBS server private key, to the SBS agent through the HTTPS communication by the SBS server TLS certificate;

verifying the message by the SBS server certificate; and storing a request hash.

6. The method according to claim 4, wherein the step of installing the bootstrapping data in the SBS server by the SBS agent comprises steps of:

transmitting an enrollment;

creating an enrollment certificate downloading message with a request hash;

encrypting the downloading message with an SBS server certificate;

making a request for downloading the bootstrapping data through hypertext transfer protocol over secure sockets layer (HTTPS) communication using an SBS server transport layer security (TLS) certificate;

signing the bootstrapping data with an SBS server private key;

transmitting the bootstrapping data, which is signed with the SBS server private key, to the SBS agent through the HTTPS communication by the SBS server TLS certificate;

verifying the bootstrapping data by the SBS server certificate; and storing the bootstrapping data, and installing the bootstrapping data after verifying the enrolment certificate in the bootstrapping data.

* * * * *